United States Patent [19]
Garwood

[11] 3,863,767
[45] Feb. 4, 1975

[54] BICYCLE SECURITY RACK

[76] Inventor: William Guy Garwood, 1650 Waverly St., Palo Alto, Calif. 94301

[22] Filed: Dec. 13, 1973

[21] Appl. No.: 424,509

Related U.S. Application Data

[63] Continuation-in-part of Ser. No. 223,581, Feb. 4, 1972, abandoned.

[52] U.S. Cl............................ 211/5, 211/8, 211/20, 70/234
[51] Int. Cl............................................ E05b 71/00
[58] Field of Search ................. 211/5, 22, 20, 17, 9; 70/234, 235

[56] References Cited
UNITED STATES PATENTS

| | | | |
|---|---|---|---|
| 565,067 | 8/1896 | Westphal | 211/9 X |
| 1,202,444 | 10/1916 | Soleau | 70/234 |
| 2,803,349 | 8/1957 | Talbot | 211/22 |
| 3,739,609 | 6/1973 | Kaufmann | 211/5 X |

FOREIGN PATENTS OR APPLICATIONS

| | | | |
|---|---|---|---|
| 1,628 | 7/1897 | Denmark | 211/20 |

*Primary Examiner*—Roy D. Frazier
*Assistant Examiner*—Peter A. Aschenbrenner
*Attorney, Agent, or Firm*—Townsend and Townsend

[57] ABSTRACT

A rack for vehicles such as two-wheel bicycles is provided which secures the vehicle and each of its major component parts. The rack includes means for securing the front wheel of the bicycle including a horizontal U-shaped portion and a vertical U-shaped portion continuous to the horizontal portion. Means for securing the rear wheel extends aftwardly from and is fixed to the front wheel securing means. Arm means can be extended transversely from the rear wheel securing means to a position slightly above and at least partially spanning the chain stays of the bicycle when the front wheel is inserted in the front wheel securing means. The arm extends through the spokes of the rear wheel, and includes depending portions which coact with the chain stays. Means are provided for locking the arm means in position to prevent removal of each of the wheels and frame of the bicycle either individually or assembled when the bicycle is locked in the rack.

10 Claims, 17 Drawing Figures

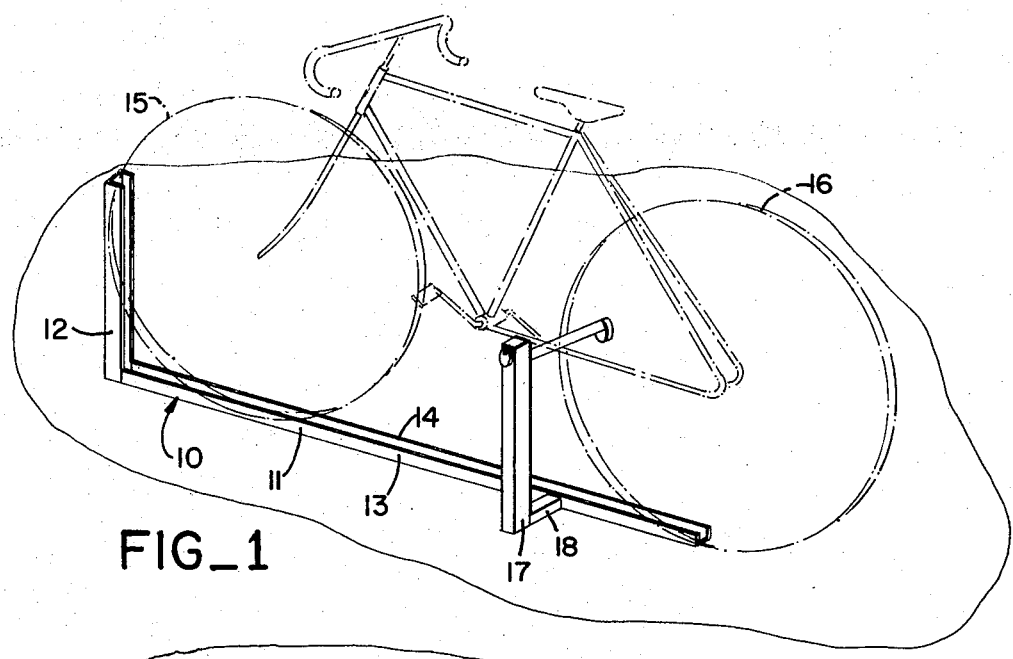
FIG_1
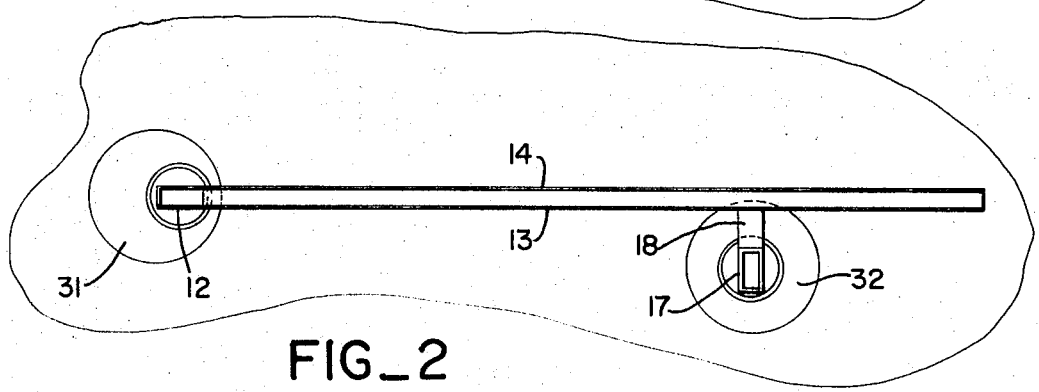
FIG_2
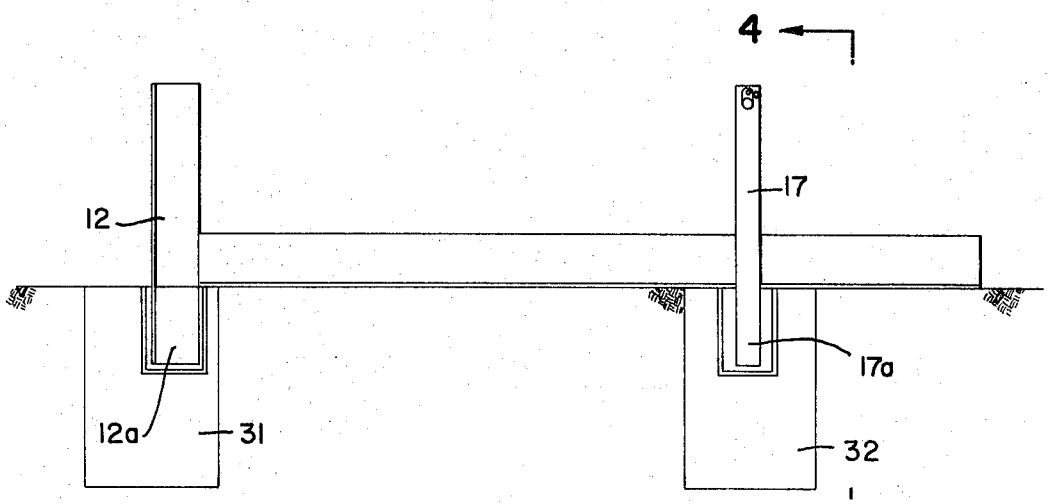
FIG_3

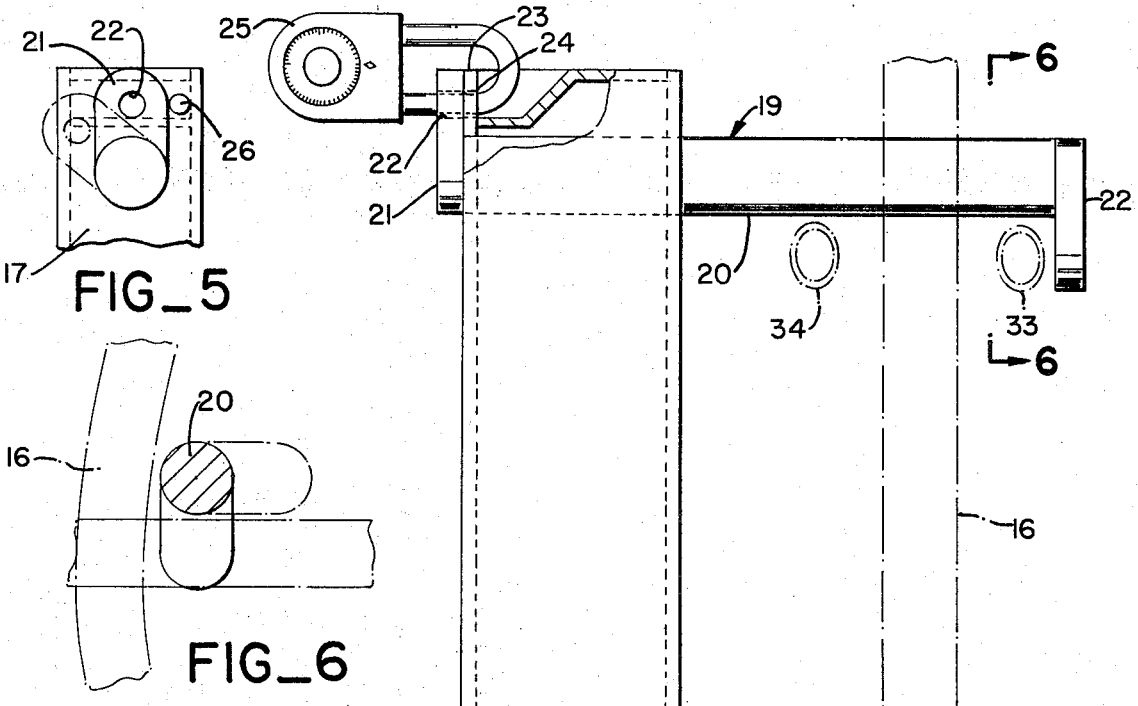
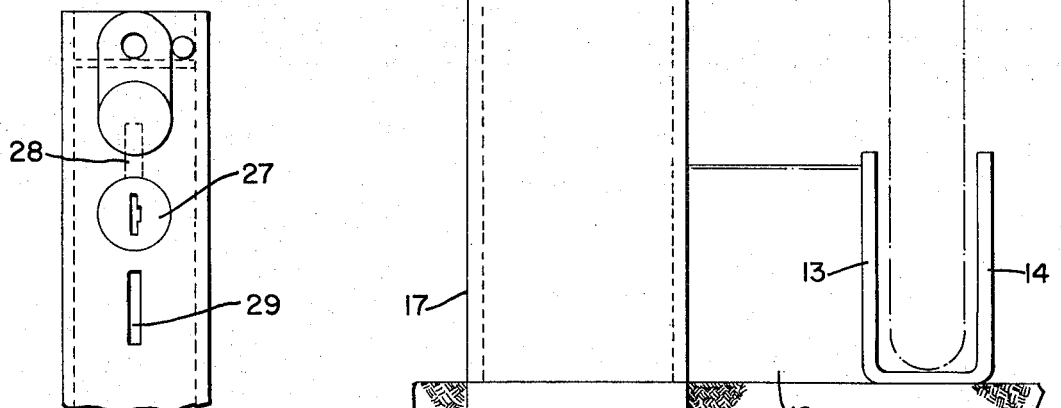
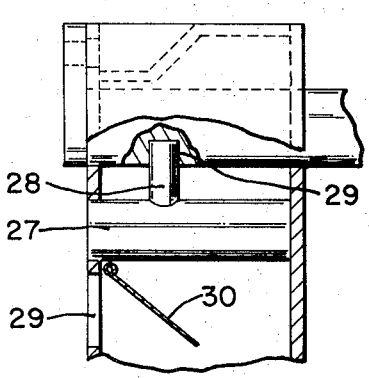

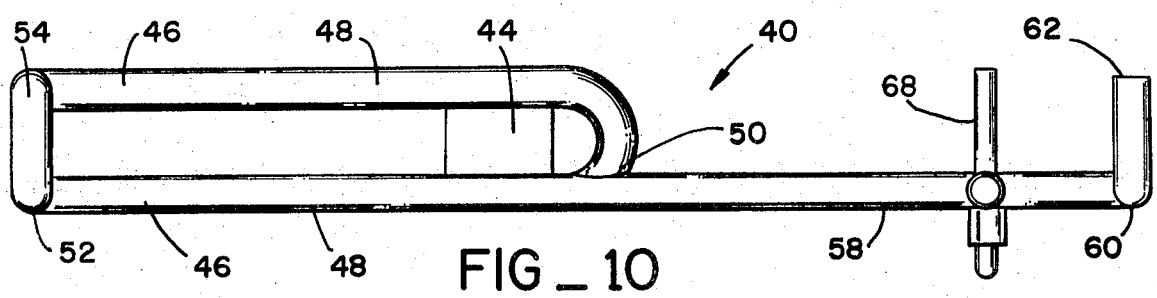
FIG_10
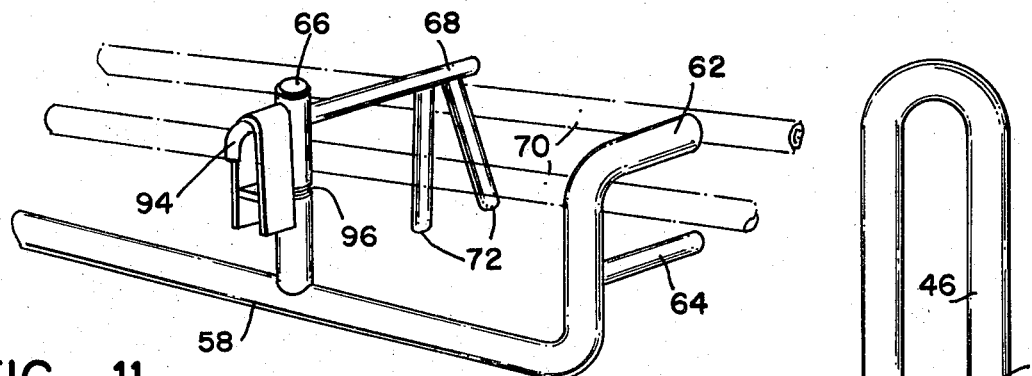
FIG_11
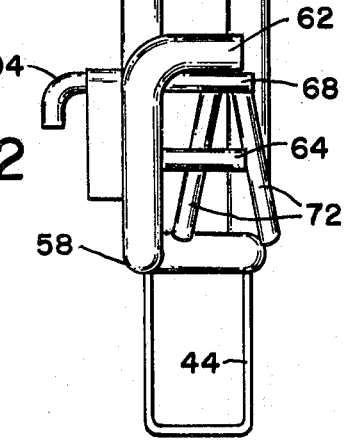
FIG_12
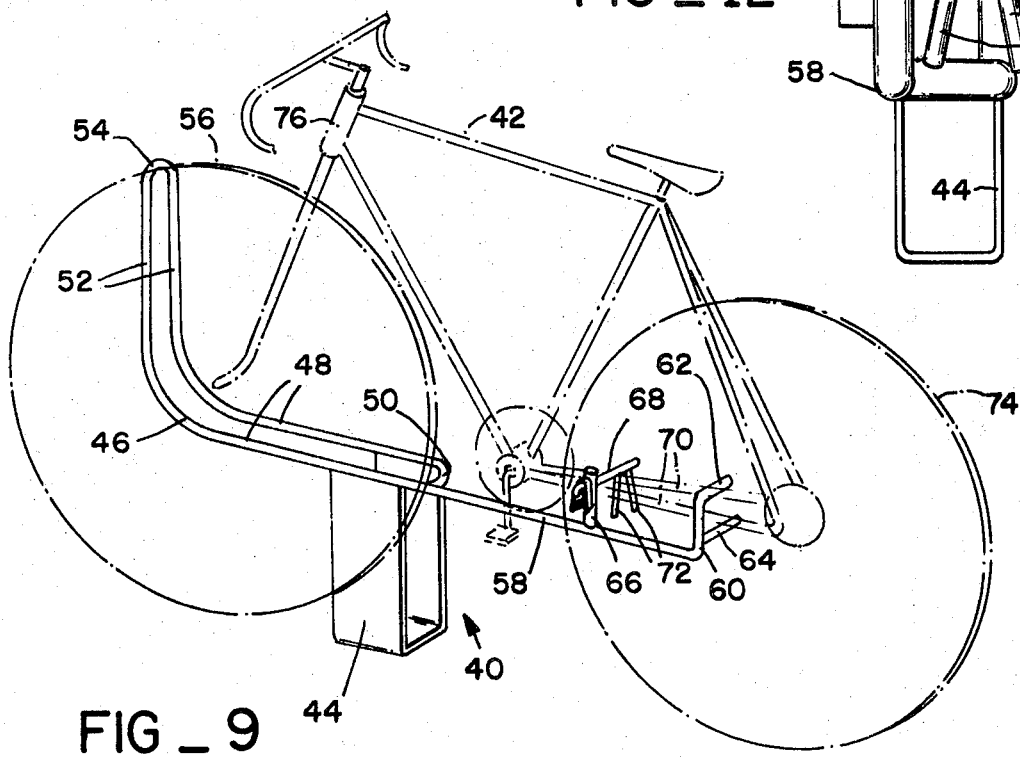
FIG_9

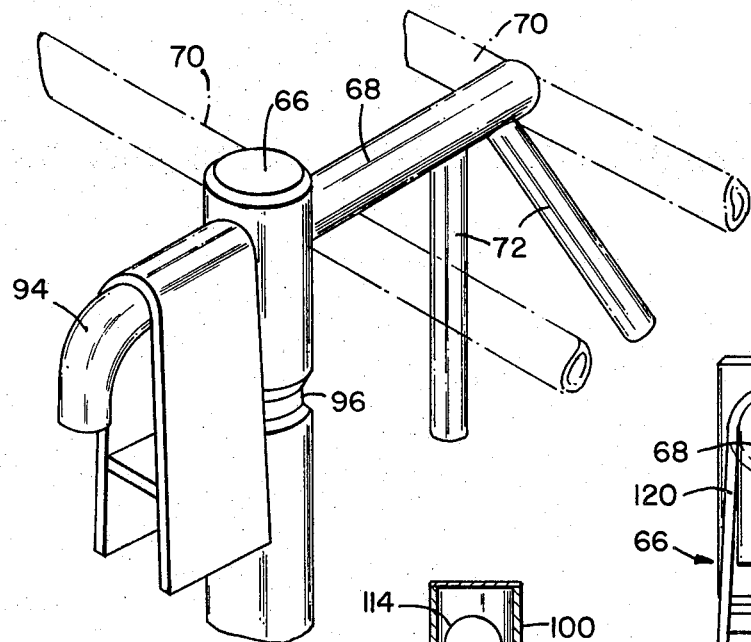
FIG_13
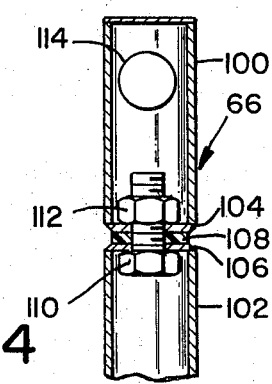
FIG_14
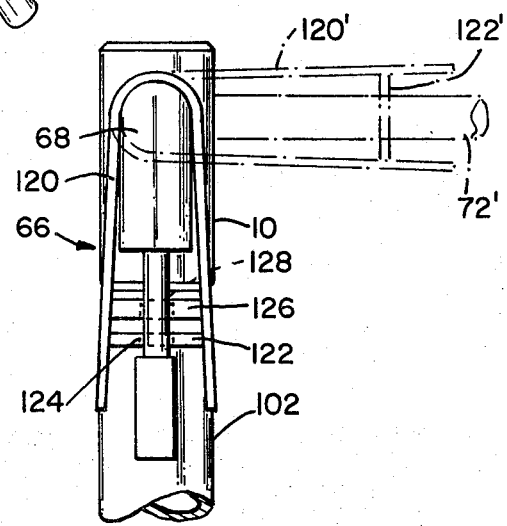
FIG_15
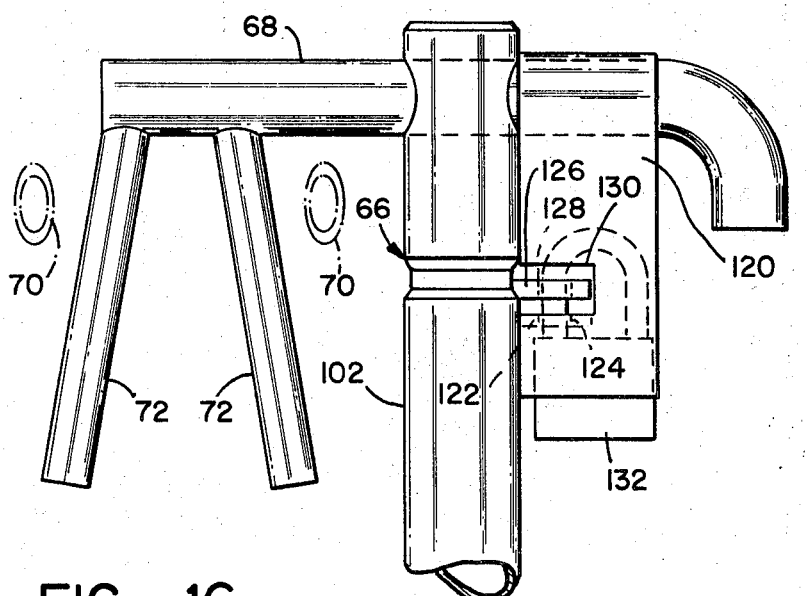
FIG_16
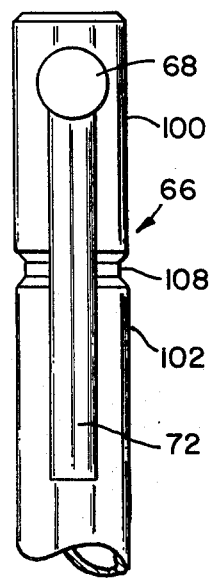
FIG_17

BICYCLE SECURITY RACK

This application is a continuation in part of my co-pending application for a BICYCLE SECURITY RACK, Ser. No. 223,581, filed Feb. 4, 1972, and now abandoned.

This invention relates to a security rack for vehicles such as two-wheel bicycles and motorcycles which prevents physical removal of the main chassis or frame of the vehicle and/or the individual wheels.

Unauthorized removal or theft of bicycles or the major components thereof has recently grown to enormous numbers. Many of the presently used techniques for securing such vehicles are inadequate in that usually only a part of the major components is protected. For example, a lock and chain frequently only secures one wheel or the frame of a bicycle permitting theft of the remaining unchained wheel. While it is possible with the use of a series of chains and other security devices to protect the entire vehicle, the complexity and inconvenience of carrying the excessive weight of such items has resulted in vehicle owners being forced to accept less than complete security with attendant losses of property.

The present invention provides a rack which can be simply activated with the movement of one small member to protect all of the major assemblies of a two-wheeled vehicles such as a bicycle or motorcycle. At most, the vehicle owner need carry only a convention hand-operated lock. In addition, the rack is adapted for being anchored in concrete so that both the security system and vehicle cannot be removed together.

The apparatus of the present invention utilizes four specific points of either the bicycle frame or rack in combination to secure the major elements of the bicycle. Each of these four elements is critical: first, the front fork crown of the bicycle itself; second, the vertical and horizontal U-shaped members providing the front wheel securing means; third, the throw bar or arm and its depending portions extensible through the rear wheel of the bicycle; and fourth, the channel portion or transverse fingers forming the rear wheel securing means. The proper combination of these elements as set forth herein is required to achieve the object of the present invention, namely, bicycle rack which secures all of the major component elements thereof.

The invention is illustrated in the accompanying drawings in which:

FIG. 1 is a perspective view of the first embodiment of the present security rack showing a bicycle (in phantom) inserted in the rack in a position to be secured therein.

FIG. 2 is a plan view of the present security rack.

FIG. 3 is a composite side-sectional and elevational view of the security rack shown in FIG. 2 further illustrating how the rack may be secured to the ground.

FIG. 4 is an end-sectional view taken along the lines 4—4 of FIG. 3 of the present security rack and also illustrating the position of a bicycle wheel which may be locked therein with a hand-placed lock as shown.

FIG. 5 is a side elevation of the lockable portion of the throw bar of the present security rack.

FIG. 6 is a sectional view taken along the lines 6—6 of FIG. 4 showing the relationship of the throw bar and rear wheel and chain stays of a bicycle which may be locked within the rack.

FIG. 7 is a side-elevational view of the locking portion of the throw bar and its housing and including an alternative coin-operated key-actuated locked assembly which may optionally be included in the security rack.

FIG. 8 is a side view with parts broken away of the throw bar, housing, and key-actuated locking mechanism of FIG. 7.

FIG. 9 is a perspective view of the second embodiment of the present security rack showing a bicycle (in phantom) inserted in the rack in a position to be secured therein.

FIG. 10 is a top view of the security rack illustrated in FIG. 9.

FIG. 11 is a fragmentary perspective view of the rear wheel securing means of the second embodiment of the present invention.

FIG. 12 is a rear elevation view of the second embodiment of the present invention.

FIG. 13 is a fragmentary perspective view of the rotatable arm of the second embodiment of the present invention.

FIG. 14 is a fragmentary elevation view of the post of the present invention.

FIG. 15 is a fragmentary elevation view of the locking mechanism of the present invention.

FIG. 16 is a rear elevation view of the locking mechanism of the present invention.

FIG. 17 is a fragmentary side elevation view of the post and rotatable arm of the second embodiment of the present invention.

In brief summary, in the preferred embodiments the present security rack is designed to accommodate two-wheeled bicycles and motorcycles, particularly the lightweight motorbikes. One embodiment of such a rack includes an elongate track or channel means including a horizontal portion and a generally vertical portion for limiting movement of both wheels of an upright two-wheeled bicycle transversely of the longitudinal axis of the channel means when the wheels are inserted therein. Arm means which may also be specifically referred to as a throw bar is mounted adjacent to the channel means for movement into and out of coaction with the rear wheel and chain stays of the bicycle.

Coaction between the arm means and the chain stays with the wheels in the channel means limits vertical and rotational movement of the frame of the bicycle relative to the channel means. The generally vertical portion of the channel means when in engagement with the front wheel of the bicycle and the coaction of the arm means with the rear wheel of the bicycle limit movement of the bicycle in the direction of the longitudinal axis of the horizontal portion of the channel means. The generally vertical portion of the channel means when in engagement with the front wheel of the bicycle also assists in limiting rotational movement of the bicycle about the channel means. The size of the parts such as the height of the channel walls and the length of the channel means are selected so that the limits of bicycle movement within the rack are such as to prevent removal of each of the wheels and frame of the bicycle. Parts need not actually touch the bicycle to accomplish the desired result. For example, the arm means need not contact the chain stays.

For simplicity, reference hereinafter will be made only to bicycles although it should be understood that to the extent the discussion is applicable, motorcycles and their corresponding parts are contemplated. Thus, in the present context, the chain stays of a bicycle are referred to which are called the rear fork in a motorbike. The aforementioned arm means should therefore be understood to coact with the rear wheel and rear fork of a motorbike. Similarly, reference hereinafter will be made to the front fork crown on a bicycle. The invention would be equivalently applicable to a motorbike to that portion of its structure known as the front fork bridge.

More particularly and with respect to the drawings, in FIG. 1 the channel means takes the form of an elongate track shown generally at 10 having a horizontal portion 11 and a vertical portion 12. Track 10 includes sidewalls 13 and 14 within which are received front bicycle wheel 15 and rear bicycle wheel 16. Sidewalls 13 and 14 are shown as continuous members along the entire length of track 10 but functionally need only be included in the region where the bicycle wheels 15 and 15 are located.

Spaced from track 10 is vertically disposed housing 17 which may be suitably connected to track 10 through horizontal bar 18. Housing 17 is preferably spaced from track 10 a sufficient distance to permit movement of the bicycle along track 10 so that the bicycle pedals and pedal cranks are not obstructed.

As may be seen most clearly in FIG. 4, reciprocatable arm means or throw bar 19 is journalled through the top of housing 17. Throw bar 19 preferably takes the form of a crank-shaped member including an elongate central portion 20 having depending ears 21 and 22 mounted at the two ends of elongate portion 20. Ear 21 defines an aperture 22 therethrough. The top of housing 17 includes a vertical wall extension 23 which defines a mating aperture 24 therethrough. Crank-shaped throw bar 19 is freely rotatable and slidable within housing 17 so that ear 21 can be rotated into a position whereby aperture 22 and aperture 24 are in alignment. Lock 25 can thereby be inserted through apertures 22 and 24 to prevent further rotation or reciprocation of throw bar 19. Stud 26 may be included on the face of housing 17 to assist in alignment of apertures 22 and 24. When lock 25 is removed, ear 21 may be rotated counterclockwise as best seen in FIG. 5.

In addition to the hand placed locking scheme employing apertures 22 and 24, the present invention contemplates inclusion of a key-operated coin-activatable locking mechanism as shown in FIGS. 7 and 8. This optional locking system includes a conventional key-operated tumbler assembly 27 which actuates bolt 28. Rotation of tumbler assembly 27 causes bolt 28 to enter a cooperating slot 29 in the adjacent surface of elongate central portion 20 of throw bar 19. Also included is a conventional coin-activated assembly including a coin slot 29. Insertion of a coin therethrough causes movement of key release mechanism 30 so that the key (not shown) used to rotate tumbler assembly 27 into locking position can be removed. The coin-operated locking mechanism is advantageous in permitting recoupment of capital expense for installing the present bicycle security rack. It is contemplated that during the time that it is desired to produce revenue, apertures 22 and 24 can be temporarily plugged (not shown) until such time that coin operation is no longer desired. Then the temporary plugs can be removed from apertures 22 and 24 and the system thereafter used on a cost-free basis employing only hand-placed locks such as lock 25.

As seen best in FIGS. 3 and 4, the security rack may be anchored to the ground by setting in concrete. To this end a downward extension of the vertical portion of track 12 as at 12a may be set in a mass of concrete 31. Similarly, a downward extension of housing 17 as at 17a may be set in a concrete mass 32. By virtue of the horizontal bar 18, tying housing 17 to track 10 the rack is secured to the ground at two convenient points which effectively prevents removal of the entire rack and bicycle.

In operation, a bicycle as shown in FIG. 1 is wheeled along track 10 until front wheel 15 abuts vertical portion 12 of track 10. During this maneuver throw bar or arm 19 is pulled outwardly from housing 17 until stopped by ear 22 to permit ingress of the bicycle to the position shown in FIG. 1. Thereafter, throw bar 19 is reciprocated through the internal diameter of rear wheel 16. Throw bar 19 may be rotated within housing 17 to permit ear 22 to clear through the spokes of wheel 16. When fully inserted, throw bar 19 is positioned so that ear 22 depends over the exterior surface of chain stay 33. This may be seen most clearly in FIG. 4. At the same time chain stay 34 lies just beneath the central portion 20 of throw bar 19. In this position of throw bar 19 apertures 22 and 24 are in alignment and lock 25 may be inserted as shown in FIG. 4.

As may be seen most clearly in FIG. 6, central portion 20 of throw bar 19 is closely adjacent to the inside rim surface of rear bicycle wheel 16. The position of arm 19 relative to the inside of wheel 16 together with the abutment of wheel 15 with vertical portion 12 of track 10 prevents movement of the bicycle longitudinally along track 10. The position of elongate central portion 20 of arm 19 over chain stays 33 and 34 substantially prevents upward vertical movement of the bicycle when installed in track 10. The position of arm 19 over chain stays 33 and 34 together with sidewalls 13 and 14, both in horizontal portion 11 and vertical portion 12 of track 10, cooperate to prevent rotational movement of the bicycle about track 10. In this latter limitation of movement, depending ear 22 which may be optionally included, assists in preventing rotational movement of the bicycle. Depending ear 22 may also generally be of assistance in maintaining the bicycle in an upright position.

The height of vertical track portion 12 is selected so that the distance from the top of vertical track portion 12 to the underside of the front wheel fork crown of the bicycle is less than the outer diameter of the front wheel rim of the bicycle. With such a relationship it will be seen that the front wheel cannot be removed even if the front bicycle fork were spread and disengaged from the front wheel axle. With all of the foregoing relationships, when throw bar 19 is inserted into locked position, it will be seen that the frame of the bicycle as well as each of the front and rear wheels cannot be separately or collectively removed from the security rack.

A second preferred embodiment 40 of the bicycle security rack of the present invention is illustrated by way of reference to FIG. 9. Rack 40 is illustrated with a standard two-wheel bicycle 42 in its secured position. Bicycle rack 40 has a horizontal upwardly opening support member 44 which is attached to the ground by means of epoxy, bolts or other convenient means. The function of support member 44 is to space the rack a selected distance from the ground, and it is not necessarily used to restrict motion of the bicycle. An elongate narrow loop 46 of steel rod or similar rigid material is attached to the open top of support member 44. Loop 46 has a substantially horizontal portion 48 closed at the rear end 50 thereof so that it has a U-shaped configuration. A substantially vertical portion 48 of loop 46 is continuous to the horizontal position and is closed at its upper end 54 so that it also has a U-shaped configuration. Wheel 56 of bicycle 42 can be inserted into loop 46 by raising the forward portion of the bicycle so that wheel 56 passes over end 50 of the loop, and then moving the front wheel forwardly and downwardly until the wheel touches the ground. The width of loop 46 is sufficient to allow insertion of the tire portion of wheel 56 therein, but is narrower than the hub portion of the wheel so that it cannot pass forwardly through the loop. The horizontal portion 48 of loop 46 at 50 prevents rearward motion of the bicycle, and the horizontal and vertical portions in combination prevent rotation of the bicycle. The distance between the front fork crown 76 of bicycle 42 and all portions of loop 46 is less than the diameter of wheel 56 so that the wheel cannot be removed upwardly or rearwardly.

Elongate member 58, also preferably a steel rod or other rigid material, extends aftwardly from loop 46. Upwardly extending neck 60 is continuous to the aft end of member 58. A horizontal finger 62 extends transversely from the top of neck 60. Member 58, neck 60, and transverse finger 62 can be all formed from a single steel rod or like material. A platform rod 64 is welded or otherwise fixed to neck 60 near its lower end, and is parallel to transverse finger 62.

A vertical post 66 is welded or otherwise fixed to aftwardly extending member 58 intermediate its length. A transverse arm 68 is rotatably connected to post 66 and has a central portion adapted to span the chain stays 70 of bicycle 42. A pair of throwbolt pins 72 having in combination a downwardly directed V-shaped configuration depend from the central portion of rotatable arm 68 and project between chain stays 70 of bicycle 42.

The principal difficulty with bicycle security racks known in the art is that the bicycle can usually be removed and stolen by simply detaching one or both of the wheels. A new wheel can easily be purchased to replace the one left behind. This is an especial problem with modern bicycles which are provided with quick-release wheels which allow the bicycle to be stolen from traditional bicycle racks in a matter of a few seconds. However, the bicycle security rack 40 illustrated in FIG. 9 effectively prevents removal of bicycle 42 even though front wheel 56 and rear wheel 74 are detached. Furthermore, the wheels themselves cannot be removed and stolen even when they are detached from the frame.

Specifically, if rear wheel 74 is detached, chain stays 70 of the bicycle 42 will rest on platform rod 64 which acts to replace the rear axle of the bicycle. Transverse finger 62 prevents upward and/or forward motion of the frame of the bicycle when rear wheel 74 is detached. Hence, detachment of the rear wheel 74 in no way effects the security of the frame and front wheel 56 of bicycle 42 in security rack 40 of the present invention.

When rear wheel 74 is detached from the frame of bicycle 42, it still cannot be removed from security rack 40. Downwardly and slightly outwardly extending throw bolt pins 72 span one or more spokes of the rear wheel so that it cannot be twisted sideways out of engagement with arm 68 and drawn rearwardly away from the bicycle. Since rotation of rear wheel 74 is limited by other frame members of the bicycle, and since it cannot be moved rearwardly or upwardly, it cannot be removed when bicycle 42 is locked in position.

Detachment of front wheel 56 from the frame of bicycle 42 also does not effect the security of other parts of the bicycle. Specifically, downward rotation of the frame of bicycle frame 42 is prevented by fork crown lift 76 of the bicycle as it hits wheel 56. If rear wheel 74 is also detached, members 62 and 64 functionally replace it and restrict movement of the bicycle frame. Rotatable arm 68 in combination with members 62, 64 prevents upward rotation of the frame. Hence, detachment of front wheel 56, along with detachment of rear wheel 74, does not affect the security of the frame of bicycle 42.

In summary, when bicycle 42 is secured in rack 40, the frame and the front and rear wheels thereof cannot be removed either along or in any combination. The various elements comprising the bicycle security rack 40 illustrated in FIG. 9 are more fully set forth in FIGS. 9-17.

A top view of rack 40 is illustrated in FIG. 10. The entire loop 46 including horizontal and vertical portions 48, 52, can be formed from a single steel rod or like material formed into a loop shape and welded at 90. Aftwardly extending member 58 can be a simple extension of the steel rod which is also used to form neck 60 and transverse inger 62. Rotatable arm 68 is attached to member 58.

The configuration of rotatable arm 68 and its depending throw bolt pins 72 is illustrated by FIGS. 11, 12, and 13 in combination. Arm 68 extends through post 92 and has a handle portion 94 on the opposite side from the bicycle. Post 66 has a rotatable joint 96 which will be illustrated in more detail hereinafter. Since arm 68 merely passes through an aperture in post 66, and since post 66 is rotatable about joint 96, arm 68 is rotatable about its own axis and about the vertical axis of post 92.

The central portion of rotatable arm 68 can be rotated so that it is parallel to aftwardly extending member 58 by rotating it about post 66. In this position, a bicycle can easily be inserted with its chain stays 70 passing between transverse finger 62 and platform rod 64. Arm 68 can be then rotated about post 66 so that the central portion thereof is in position just over and at least partially spanning chain stays 72 of the bicycle. Arm 68 is then rotated about its own axis by manipulating end 94 so that throw bolt pins 72 are rotated downwardly and between the respective chain stays 70. Rotatable arm 68 is then locked so that it cannot rotate either about its own axis or about the vertical axis of post 92, as hereinafter illustrated. Hence, the bicycle cannot be removed as discussed hereinabove.

The configuration of the locking mechanism of the bicycle rack shown in FIG. 9 is illustrated in more detail by way of reference to FIGS. 14–17 in combination. Specifically, post 66 is comprised of upper and lower hollow portions 100, 102. The respective ends 104, 106 of the portions are separated by a nylon washer 108. Bolt 110 and lock nut 112 secure portion 100 to portion 102 to form post 66. However, portion 100 is rotatable with respect to portion 102 so that the arm 68 extending through aperture 114 is rotatable about the vertical axis of post 66.

A padlock shield 120 is looped over rotatable arm 68 and welded or otherwise rigidly fixed thereto. Hence, hood 120 will rotate with arm 68 as illustrated by 120'. A flat bar 122 having a central aperture 124 is welded to the lower portion of hood 120. A corresponding plate 126 having a central aperture 128 is fixed to the lower portion 102 of post 66. A slot 130 is formed in the side of padlock shield 120 so that when rotatable bar 68 is rotated to a position over chain stays 70 of the bicycle, and rotated axially so that throw bolt pins 72 project downwardly between the chain stays, plate 126 will be disposed immediately above plate 122 and the respsective apertures 128, 124 will register therein. In this position, a standard padlock 132 can be passed through the registering apertures 128, 124 and locked to prevent rotation of arm 68 either about its own axis or about the vertical axis of post 66. In this position, padlock 132 is disposed below padlock shield 120 to make the lock extremely difficult to tamper with. Specifically, a saw or cutting tool must first saw through shield 120 before reaching the padlock because the shield is too narrow for direct insertion of these tools. Also, the padlock cannot be rotated upwardly higher than horizontal because of end 94 of arm 68 so that acid cannot be poured therein to destroy the lock. Furthermore, the lock cannot be frozen until it is brittle and then fractured because the cold will be dissipated by shield 120. Hence, padlock 132 is relatively impervious to standard tampering techniques, and the bicycle is secured in the rack.

While preferred embodiments of the present invention have been illustrated in detail, it is apparent that modifications and adaptations to those embodiments will occur to those skilled in the art. For example, it would be an obvious expedient to utilize a coin lock in the second embodiment. However, it is to be expressly understood that such modifications and adaptations are within the spirit and scope of the present invention, as set forth in the following claims.

What I claims as new is:

1. A bicycle security rack comprising: front wheel securing means including a horizontal U-shaped portion and a generally vertical U-shaped portion in combination for limiting movement of the front wheel of an upright two-wheel bicycle forwardly and transversely when said wheel is inserted therein; rear wheel securing means extending aftwardly from and fixed to the front wheel securing means; arm means extensible transversely from the rear wheel securing means, said arm means adapted to be extended to a position slightly above and at least partially spanning the chain stays of a two-wheel bicycle when the front wheel of said bicycle is inserted in the front wheel securing means so that said arm means extends through the spokes of the rear wheel of said bicycle, said arm means including depending portions adapted to coact with said chain stays; and means for locking the arm means in its extended position to prevent removal of each of the wheels and frame of said bicycle, either individually or assembled, when said bicycle is inserted in said rack.

2. A bicycle security rack in accordance with claim 1 wherein said arm means includes a vertically disposed housing spaced from said channel means sufficiently to allow unobstructed movement of a bicycle including its pedals and pedal cranks forwardly past said housing for insertion of the front wheel of said bicycle into the front wheel securing means, and a crank-shaped member including a enlongate central portion slidably mounted through said housing for movement into and out of coaction with the rear wheel and chain stays of said bicycle, said arm means having first and second depending ears mounted at each end of said central portion, said first ear adapted for disposition adjacent said chain stays when said arm means is in position for coaction therewith, said second ear adapted for locking said arm means relative to said housing.

3. A bicycle security rack in accordance with claim 1 wherein said front wheel securing means includes a narrow continuous rigid loop, said loop having a rearwardly closed substantially horizontal portion and an upwardly closed vertical portion continuous to the horizontal portion, and means for mounting said horizontal portion to the ground and supporting said horizontal portion in such relationship with said ground, the distance from the vertical and horizontal portions of the front wheel securing means to the front fork crown of the bicycle being less than the outer diameter of the front wheel of said bicycle to substantially prevent removal of said front wheel from the security rack.

4. A bicycle rack in accordance with claim 2 wherein the rear wheel securing means comprises a generally horizontal upwardly opening channel extending aftwardly from the horizontal portion of the front wheel securing means, said channel limiting movement of said rear wheel of said bicycle transversely of the longitudinal axis of the channel means when said wheel is inserted therein..

5. A bicycle security rack in accordance with claim 3 wherein said rear wheel securing means includes an elongate member extending aftwardly from the horizontal portion of the front wheel securing means, a finger extending transversely from the aftwardly extending member and adapted to overlie the chain stays of the two-wheel bicycle, and a platform rod fixed to the aftwardly extending member, said platform rod being below and parallel with the transverse finger and adapted to pass beneath the chain stays of the two-wheel bicycle.

6. A bicycle security rack in accordance with claim 3 wherein said arm means includes a horizontal elongate central portion rotatable about its axis and about a vertical axis respectively, said central portion being rotatable about the vertical axis so that said central portion extends through the spokes of the rear wheel of said bicycle, the depending portions of said arm means comprising a pair of side-by-side throw bolt pins spaced axially along the central portion and extending substantially upwardly therefrom, said throw bolt pins being mutually complementary outwardly inclined to form an outwardly extending V-configuration, said throw bolt pins being adapted to extend downwardly and between the chain stays of said bicycle upon rotation of said central portion about its axis to secure said bicycle to the security rack.

7. A bicycle security rack in accordance with claim 6 wherein said locking means includes means for preventing rotation of the central portion of the arm means.

8. A bicycle security rack in accordance with claim 7 wherein said locking means includes a lock, and shield means for preventing tampering with said lock.

9. A bicycle security rack comprising: an upwardly opening U-shaped member fixed to the ground; a narrow continuous loop having a rearwardly closed substantially horizontal portion fixed to the top of the U-shaped member and an upwardly closed vertical portion continuous to the horizontal portion, the interior height of said vertical portion being slightly less than the exterior diameter of the front wheel of a standard bicycle; an elongate member extending aftwardly from and rigidly fixed to said loop; a transverse finger extending transversely from the aftwardly extending member and adapted to overlie the chain stays of a two-wheel bicycle; a platform rod fixed to the aftwardly extending member, said platform rod being below and parallel with the transverse finger and adapted to pass beneath the chain stays of a two-wheel bicycle; a vertical post fixed to aftwardly extending member, said post having an axially rotatable upper portion and a radial passage through said portion; an axially rotatable arm adapted to pass through the radial passage in the rotatable upper portion of said post, said rotatable arm adapted to at least partially span said chain stays upon rotation of the upper portion of said rotatable post; side-by-side throw bolt pins spaced axially along said rotatable arm, said throw bolt pins adapted to depend from said rotatable arm and project through said chain stays upon rotation of said rotatable arm; and means for locking the position of the rotatable arm when the throw bolt pins project between the chain stays of the bicycle to prevent removal of each of the wheels and the frame of the bicycle, either individually or assembled, when said bicycle is inserted in the rack.

10. A bicycle security rack in accordance with claim 9 wherein said rotatable arm includes a downwardly curved handle portion adjacent the post opposite from the portion adapted to span the chain stays; and wherein the locking means includes a rigid hood member attached to the arm adjacent the handle portion, a first apertured plate fixed to the interior of the hood adjacent the lower end thereof, a second apertured plate fixed to the non-rotatable lower portion of the post, the apertures in said first and second plates adapted to register when the rotatable arm is rotated to a position wherein said throw bolt pins depend downwardly from said arm through the chain stays, so that a standard padlock can be inserted through the registering apertures and locked to prevent rotation of the rotatable arm about its own axis or about the axis of the post, said hood substantially preventing tampering with said padlock, the downwardly curved handle portion of said arm preventing upward rotation of said padlock for pouring of acid therein.

* * * * *